United States Patent [19]
Vook et al.

[11] Patent Number: 5,982,327
[45] Date of Patent: Nov. 9, 1999

[54] ADAPTIVE ARRAY METHOD, DEVICE, BASE STATION AND SUBSCRIBER UNIT

[75] Inventors: Frederick Werner Vook, Schaumburg; Kevin Lynn Baum, Rolling Meadows, both of Ill.

[73] Assignee: Motorola, Inc., Schaumburg, Ill.

[21] Appl. No.: 09/005,998

[22] Filed: Jan. 12, 1998

[51] Int. Cl.$^6$ .................................. G01S 3/16; G01S 3/28
[52] U.S. Cl. ........................... 342/380; 342/378; 342/382; 342/383
[58] Field of Search ..................................... 342/378, 380, 342/382, 383

[56] References Cited

U.S. PATENT DOCUMENTS

| | | | |
|---|---|---|---|
| 4,146,889 | 3/1979 | Brennan et al. | 343/5 R |
| 4,179,696 | 12/1979 | Quesinberry et al. | 343/7.4 |
| 5,299,148 | 3/1994 | Gardner et al. | 364/574 |
| 5,311,192 | 5/1994 | Varga et al. | 342/188 |
| 5,371,506 | 12/1994 | Yu et al. | 342/380 |
| 5,600,326 | 2/1997 | Yu et al. | 342/17 |

OTHER PUBLICATIONS

Arogyaswami J. Paulraj and Constantinos B. Papadias "Space–Time Processing for Wireless Communications" IEEE Signal Processing Magazine, Nov. 1997, pp. 49–83.

I.S. Reed, J.D. Mallett, and L.E. Brennan "Rapid Convergence Rate in Adaptive Arrays" IEEE Transactions of Aerospace and Electronic Systems, vol. AES–10, No. 6, Nov. 1974, pp. 853–863.

*Primary Examiner*—Thomas H. Tarcza
*Assistant Examiner*—Dao L. Phan
*Attorney, Agent, or Firm*—Darleen J. Stockley

[57] ABSTRACT

The present invention provides a method, device, base station and subscriber unit for combining a plurality of antenna output signals to provide a combined data signal in a communication system where the antennas receive at least one user signal and where the at least one user signal contains pilot symbols and data symbols. The method includes the steps of: forming, in at least one communications receiver, a plurality of weighted antenna output signals, one for each antenna of a plurality of antennas, based on at least two covariance matrices and at least two steering vectors determined from the pilot symbols; and combining the weighted antenna output signals from the plurality of antennas to form the combined data signal.

23 Claims, 6 Drawing Sheets

ADAPTIVE ARRAY METHOD, DEVICE, BASE STATION AND SUBSCRIBER UNIT

FIELD OF THE INVENTION

The present invention is directed to a communication receiver and in particular to combining the signals received from an antenna array.

BACKGROUND OF THE INVENTION

An adaptive antenna array is an array of antennas connected to a communications receiver and operates by combining the signals received by the antennas so as to optimize in an adaptive fashion the receive characteristics of the array. By weighting and then summing the multiple antenna signals, the adaptive antenna array can adapt its angular response, sometimes called the array pattern, while it operates, in response to changes in the propagation environment. While operating, the adaptive antenna attempts to maximize the reception of the signal received from a desired transmitting device, while simultaneously minimizing the effects of all other unwanted interfering signals and noise. In a communication system, the interference suppression capability of an adaptive antenna array offers the potential to reduce co-channel interference, improve coverage quality, and increase overall system capacity.

A problem associated with employing an adaptive antenna in a wireless communication system lies in the design of a combining algorithm and device that has adequate ability to track changes in the signal environment. Adaptive antennas that operate in a fast-fading multipath environment should adapt to the rapidly varying channel as well as to any changes in the nature of the desired and interfering signals. The ability of the antenna combining algorithm to track a faded channel will directly impact its overall performance. Algorithms which cannot track channel variations suffer significant degradation in performance as measured by the bit-error rate (BER) or signal-to-interference-plus-noise ratio (SINR).

In a communication system, a practice known in the art is for a transmitting device to transmit a plurality of pilot symbols and a plurality of data symbols to a receiving device. The data symbols contain the information (such as voice, data, or multimedia information) that is communicated to the receiver by the transmitter. The receiving device has prior knowledge of the nature of the transmitted pilot symbols and can use the received pilot symbols to perform such tasks as carrier recovery, channel estimation, and other related tasks that are known in the art for maintaining a high-quality communication link. In order to exploit the allocated spectrum most efficiently, it would be advantageous to minimize the percentage of the transmitted symbols that are pilot symbols.

In a commonly used adaptive antenna technique, the array combining weights are computed from a known sequence of pilot symbols, and these weights are then applied to subsequently received data symbols. In this technique, the portion of the allocated time-frequency spectrum in which pilot symbols are transmitted by the desired transmitter is known as the training interval. The interval in which the weights are applied to the data symbols is known as the application interval. For best performance, these adaptive antenna techniques require the channel and signal characteristics to be relatively constant over both the training interval and the application interval. If the channel changes significantly within either interval, the performance will suffer. Furthermore, if the channel is effectively constant within both intervals but is different from interval to interval, then the performance will also suffer. Therefore, to effectively suppress interference, an antenna signal combiner must have the ability to track variations in the channel. For best efficiency, the number of pilot symbols required by the combiner should be kept to a minimum.

The design of adaptive antenna systems that exploit pilot symbols becomes one of finding the best balance between performance and efficiency. Increasing the number of pilot symbols will provide better performance in a static channel, but will reduce the system efficiency as defined by the ratio of information data symbols to pilot symbols. However, using a larger number of pilot symbols will increase the likelihood that the channel will vary over the training and application intervals, which is a situation that will result in degraded performance. On the other hand, using fewer pilot symbols will improve the likelihood of a static channel, but using too few pilot symbols can also degrade performance in a static channel. As a result, there is a need for a method and device that utilize adaptive antenna techniques that satisfy the contradicting goals of maximizing efficiency while simultaneously being able to track variations in the channel.

DETAILED DESCRIPTION OF A PREFERRED EMBODIMENT

Briefly described, the present invention is a method, device, base station, and subscriber unit for combining the signals received by an antenna array operating in a communication system. The method and device combine the antenna signals to suppress interference and improve the quality, measured by the channel bit error rate or another preselected measure, of the signal transmitted by a desired transmitter. The invention operates on sequences of pilot symbols transmitted by a desired transmitter and allows the receiving device to receive and decode data successfully from the desired transmitter even in cases where significant interference is present on the channel. Furthermore, the invention effectively tracks variations in the propagation channel that often occur in terrestrial communication channels. The invention utilizes a technique that allows effective interference suppression in portions of the allocated time-frequency spectrum in which the transmitter does not transmit pilot symbols to the receiver. This technique permits a significant reduction in the number of pilot symbols that are required to be transmitted by the desired transmitter. Reducing the rate at which pilot symbols are transmitted results in an increase in the overall efficiency of the communication link.

A preferred embodiment for the present invention is a communications receiving device, base station, or subscriber unit operating in a communication system employing Orthogonal Frequency Division Multiplexing (OFDM), which is a form of multicarrier modulation (MCM). OFDM is a wideband multiple access technology that offers benefits in a mobile wireless communication system. Some of the advantages of OFDM are its flexibility, scalability, and its ability to communicate a wideband signal without the use of complex temporal equalization schemes.

Figure 3:
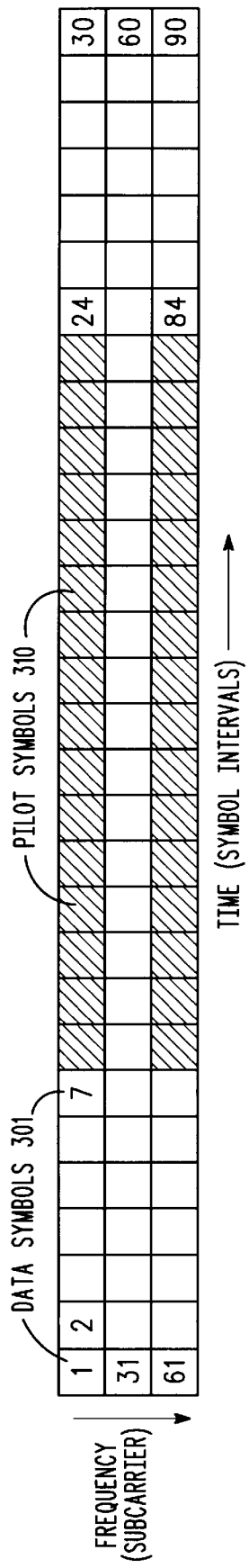
FIG. 3 is a representation of the structure of two time-frequency slots which can be used by the communication system in which the device in FIG. 1 operates.
Figure 3:
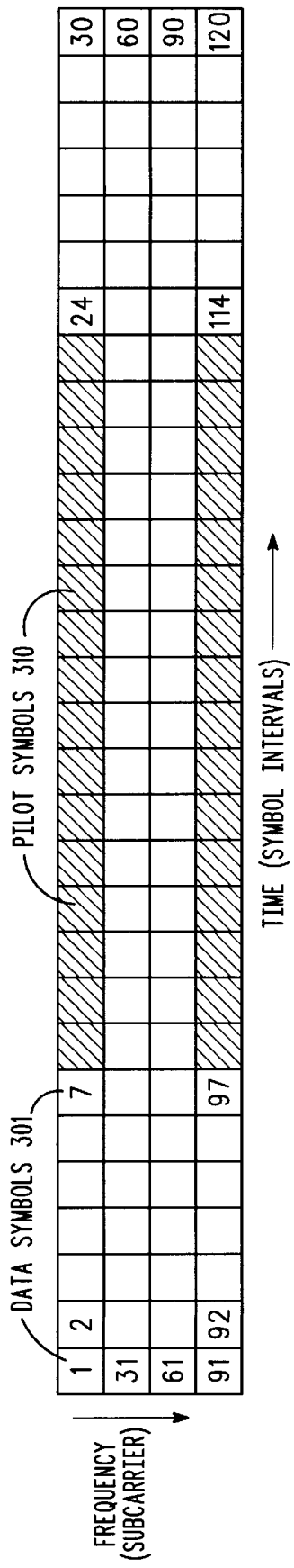

A preferred embodiment of the present invention described below typically operates in a low-mobility delay-spread channel and operates under the assumption that the channel changes rather slowly over time, but significantly over frequency. This assumption is appropriate in many wireless systems such as wireless local loop systems or wireless fixed access systems. In this type of system, one possible strategy is to deploy sequences of pilot symbols on each subcarrier so that the channel response, or any other items that are required in the operation of the communication link, may be measured on any of the subcarriers within the allocated bandwidth. However, deploying a pilot sequence on every allocated subcarrier would adversely effect communications efficiency. Therefore, within the allocated bandwidth, it would be advantageous to deploy many subcarriers without pilot symbols, as is shown in FIG. 3.

In an OFDM system employing an adaptive antenna array that operates on the pilot symbols transmitted by the desired transmitter, it can be difficult to guarantee that the channel will be constant over the interval in which the pilots are transmitted and the interval in which the combining weights are computed and applied in the antenna combiner. Although the symbols transmitted on each subcarrier are assumed to undergo flat fading, the presence of delay spread can cause significant decorrelation in the fading processes on the different subcarriers within a time-frequency slot. Even in a system where the transmitter and receiver are physically stationary, temporal variations in the channel can and will occur due to the motion of any surrounding objects in the system. Furthermore, implementing a least-squares combining algorithm, as is known in the art, generally requires a number of training symbols equal to at least twice the number of antenna elements to obtain an average SINR within 3 dB of the theoretical optimum value. Applying prior art techniques to an array containing a large number of antenna elements will therefore require a rather long pilot sequence, and the typically low symbol rate of OFDM will reduce the likelihood of a constant channel over the intervals in which the pilot symbols are transmitted and the combining weights are applied to the received data. An advantage of the present invention is its capability to minimize the percentage of the time-frequency allocation that is occupied by pilot sequences while simultaneously being able to track variations in the channel.

When operating a communication system, such as OFDM, in a frequency-selective propagation environment, algorithms that are wideband in nature are used to control the antenna combiner. Many wideband combining algorithms known in the art are highly complex and are in some situations unable to adapt fast enough to a rapidly varying communication channel. An advantage of the present invention is its ability to adapt to significant variations in the channel that occur across frequency without requiring the desired transmitter to transmit a pilot sequence on every subcarrier or subchannel within the allocated bandwidth.

Figure 1:
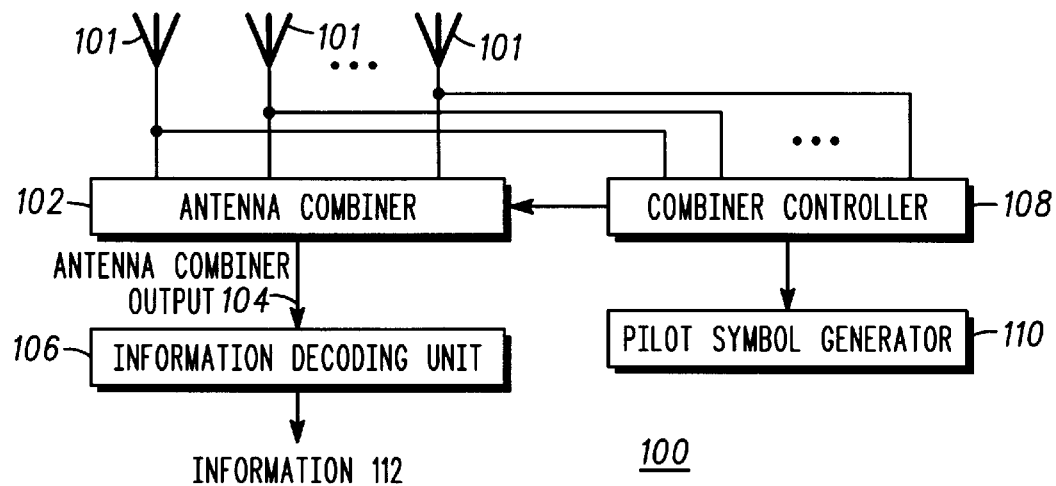
FIG. 1 is a block diagram illustrating components of a preferred embodiment of a device in accordance with the present invention.

FIG. 1, numeral 100, is a block diagram showing the components which make up a preferred embodiment of the present invention. The invention contains a plurality of antennas (101) whose received signals are fed into at least one Antenna Combiner (102). The signals from the antennas (101) are also fed into the Combiner Controller (108), which regulates the operation of the Antenna Combiner (102). The Pilot Symbol Generator (110) generates pilot symbol information that is used by the Combiner Controller (108) to control the Antenna Combiner (102). The output of the Antenna Combiner (102) is fed into an Information Decoding Unit (106), which decodes the Antenna Combiner Output (104) and generates the data information (112) that was received by the Antennas (101).

Figure 2:
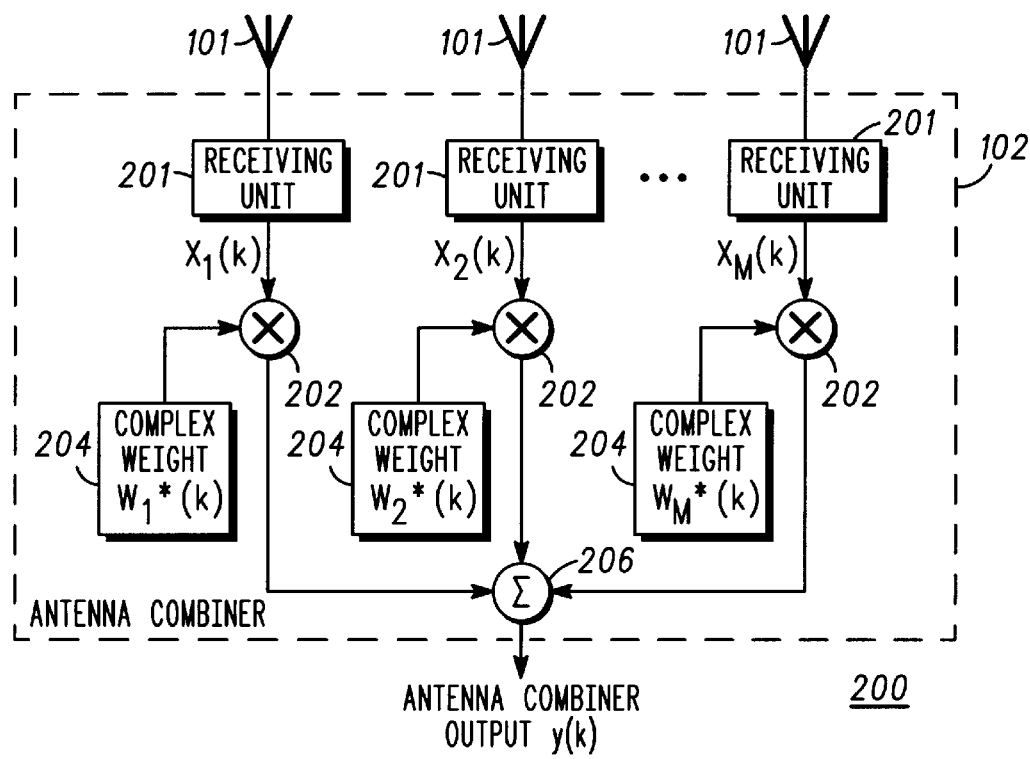
FIG. 2 is a block diagram illustrating components of a preferred embodiment of the Antenna Combiner of the device of FIG. 1.

FIG. 2, numeral 200, is a block diagram illustrating the components which make up a preferred embodiment of the Antenna Combiner (102) of the device of the present invention. A preferred embodiment of the Antenna Combiner (102) consists of receiving units (201) which accept input from the antennas (101). In a preferred embodiment, the receiving units (201) may consist of radio frequency pre-amplifiers, filters, and demodulators, and other devices which can be used to convert the radio frequency signal received by the antenna down to a digital stream of baseband equivalent complex symbols. As shown in FIG. 2, the output of the i'th receiving unit (201) is mathematically denoted by $x_i(k)$, where k and i are integers, and is fed to a complex multiplier (202) which multiplies the output of receiving unit (201) by a complex weight (204), mathematically denoted as $w_i(k)$, and a combiner (206) sums the outputs of the complex multipliers (204). The values of the complex weights (204) are controlled by the Combiner Controller (108), shown in FIG. 1, and are described more fully below.

In an OFDM or MCM system, it is a common practice to define a time-frequency slot to consist of a portion of the time-frequency spectrum over which a particular transmitter transmits its information to the receiver. In an OFDM system, the demodulation process for one OFDM symbol interval produces a plurality of symbols, where each symbol corresponds to one of the subcarriers of the system. The time-frequency slot consists of a pre-determined subset of the total number of OFDM subcarriers received over a pre-determined number of OFDM symbol intervals. A time-frequency slot then consists of a plurality of demodulated OFDM symbols that are received over a pre-determined number of subcarriers in frequency and a pre-determined number of symbols in time.

In the time-frequency slot, at least one transmitter is assigned to transmit its data symbols and pilot symbols to the receiver. The data symbols are used to convey the user information, such as a voice signal or multimedia data traffic, that is being communicated to the receiver. The pilot symbols are symbols known to both the transmitter and the receiver and are used by the receiver to aid in decoding the data symbols transmitted by the transmitter. Other than assisting in reliably maintaining the communication link, pilot symbols generally contain no user information and, therefore, represent a portion of the channel capacity that cannot be used for transmitting user information.

If more than one transmitter is assigned to transmit to the receiver in a time-frequency slot, then an access technique called Spatial Division Multiple Access (SDMA) is used by the receiver. The present invention can be used to allow the communication receiver to receive, separately, the signals transmitted by the multiple transmitters sharing the same time-frequency slot.

FIG. 3, numeral 300, shows the makeup of two exemplary time-frequency slots that can be implemented in a preferred embodiment of the present invention. Each time-frequency slot contains a plurality of pilot symbols (310) and at least one data symbol (301). Each symbol contained in a time-frequency slot is identified with a unique number between 1 and K inclusive, where K is an integer denoting the total number of symbols in the time-frequency slot. As shown in FIG. 3, the symbols are numbered in increasing fashion first across each subcarrier, then increasing down to the next subcarrier until the last symbol on the last subcarrier is reached. The upper time-frequency slot of FIG. 3 shows a time-frequency slot that is 3 subcarriers long in frequency and 30 symbols long in time, for a total of 90 symbols. In the upper slot of FIG. 3, each symbol is numbered from 1 to 90 beginning, as shown, with the earliest symbol on the first subcarrier. The lower time-frequency slot of FIG. 3 shows a time-frequency slot that is 4subcarriers long in frequency and 30 symbols long in time, for a total of 120 symbols. In the lower slot of FIG. 3, each symbol is numbered from 1 to 120 beginning, as shown, with the earliest symbol on the first subcarrier. A group of adjacent pilot symbols in a time-frequency slot, such as the pilot symbols numbered from 8 to 23, inclusive, in FIG. 3 is also called a pilot sequence. A pilot symbol or a group of pilot symbols can also be referred to as pilot data.

To aid in the understanding the operation of the invention, a mathematical description of the present invention is now presented. In the following discussion, the variable M is an integer used to represent the number of antennas used by the present invention. The variable K is an integer that is used to denote the total number of symbols contained in the time-frequency slot. The variable P is an integer that is used to denote the number of pilot symbols contained in the time-frequency slot, and the remaining K–P symbols are user information-bearing data symbols.

The variable $x_m(k)$, for m=1,2, . . . ,M, denotes the complex baseband symbol received on the m'th antenna element at the k'th symbol instant within the time-frequency slot. In general, the wavelength of the radio frequency (RF) carrier relative to the physical positioning of the antenna elements is such that propagation-delay-induced phase shifts experienced by an incident signal on the antenna elements may be considered identical from subcarrier to subcarrier within a slot. The complex I and Q baseband representation of the symbols received on the antenna elements at the k'th symbol instant are multiplied by a complex weight vector, $w_i(k)$ (204) and these weighted antenna signals are then summed to form the antenna combiner output y(k) (212) as shown in FIG. 2:

$$y(k) = \sum_{m=1}^{M} w_m^*(k) x_m(k) \tag{1}$$

where k=1, 2, . . . , K and $w_m(k)$ is the complex weight at the k'th symbol behind the m'th antenna in the antenna combiner. The superscript * denotes complex conjugate. Using vector notation, let the signal vector x(k) be the M element column vector of antenna symbols received at the k'th symbol instant. Let w(k) denote the vector of complex weights applied to the antenna samples at the k'th symbol instant. The output of the array at the k'th symbol can then be written as the vector inner-product between the weight vector and the signal vector:

$$y(k) = w^H(k) x(k) \tag{2}$$

In a preferred embodiment, N transmitters, where N is an integer greater than zero, simultaneously transmit to the array on the same time-frequency-slot. Each transmitter transmits a signal to the receiver, and the receiving unit must separate one of these signals, the desired signal, from the other signals received by the array. If the receiver wishes to receive another one of these signals, then the receiver must separate that signal from the other signals received by the antenna array. Let $s_n(k)$, n=1,2, . . . , N, be the baseband signal transmitted by the n'th user at symbol instant k. The set of $s_n(k)$, are assumed to be statistically independent with equal unit power.

Let $a_{mn}(k)$ denote the complex baseband-equivalent channel gain between the n'th transmitter's antenna and the m'th antenna on the receive array at the k'th symbol instant, where m, n and k are integers. The contribution of the n'th transmitter's signal on the m'th receive antenna element is then given by $a_{mn}(k)s_n(k)$, for n=1,2, . . . N and m=1,2, . . . , M. The channel gain $a_{mn}(k)$ is assumed to incorporate the large-scale path loss and the log-normal fading as well as the fast multipath fading that occurs between the n'th transmitter and the m'th antenna of the receive array. The first two of these propagation effects vary rather slowly and in a preferred embodiment are assumed to be constant throughout a time-frequency slot. The fast multipath fading depends on the Doppler, delay, and angular spread of the incident multipath and can cause significant variation in the channel gains within the time-frequency slot. In the multipath propagation environment being considered, the difference in the time delay of the shortest multipath and the longest multipath is assumed to be much less than a symbol duration. Hence, no intersymbol interference is assumed, which in an OFDM system, is a valid assumption when the cyclic prefix of the OFDM symbol is longer than the maximum delay spread on the channel.

The array response vector for the n'th user at symbol k is defined to be an M-element column vector $a_n(k)$ containing the complex channel gains between the n'th user's antenna and the M receive antennas on the base array at symbol k. The total array signal vector can be written as follows:

$$x(k) = a_1(k)s_1(k) + a_2(k)s_2(k) + \ldots + a_N(k)s_N(k) + x_o(k) \tag{3}$$

where $x_o(k)$ is a vector containing the noise signals on the antenna elements at time-frequency symbol k. The output of the array is then given by:

$$y(k) = w^H(k)x(k) = w^H(k)a_1(k)s_1(k) + w^H(k)a_2(k)s_2(k) + \ldots + w^H(k)a_N(k)s_N(k) + w^H(k)x_o(k) \tag{4}$$

where superscript H denotes complex conjugate transpose.

Note that the array output has a contribution from each incident signal plus a thermal noise component. As shown in these equations, the gain between a transmitter's signal and its contribution in the output of the receive array is equal to the inner product of the array weight vector and the array response vector for that transmitter. Setting the weight vector to be parallel (co-linear) to a transmitter's array response vector will maximize the power of the transmitter's signal in the output of the array. The array weight vector is then said to be "matched" to that transmitter, which is the principle behind "Maximal Ratio Combining." On the other hand, if the weight vector is orthogonal to the array response vector of a transmitter, then the contribution of that transmitter's signal in the antenna combiner output will be completely suppressed. A typical weight-selection criterion is to maximize the ratio of the desired signal power to the combined power of the interference plus noise at the output of the array. This ratio is called the signal-to-interference-plus-noise-ratio, or SINR. The instantaneous SINR is defined to be the expected SINR when conditioned on the array response vectors and the signal and noise statistics. The instantaneous SINR at symbol k can be shown to be:

$$SINR(k) = \frac{w^H(k)\{\Phi_d(k)\}w(k)}{w^H(k)\{\Phi_u(k)\}w(k)} \quad (5)$$

where $\Phi_d(k) = a_1(k)a_1^H(k)$ is the desired spatial covariance matrix at symbol k, superscript H denotes complex conjugate transpose and $$\Phi_u(k) = a_2(k)a_2^H(k) + a_3(k)a_3^H(k) + \ldots + a_N(k)a_N^H(k) + \sigma^2 I$$

is the undesired spatial covariance matrix at symbol k, where $\sigma^2$ is the variance of the noise on each antenna element and I is an identity matrix with dimensions M×M.

This formula for SINR(k) is a Rayleigh Quotient, and the maximum value of SINR(k) is achieved with an eigenvector associated with the largest solution $\lambda$ to the generalized eigenvalue problem:

$$\Phi_d(k)w(k) = \lambda\Phi_u(k)w(k) \quad (6)$$

If signal 1 is the desired signal, then a weight vector that maximizes the instantaneous SINR can be shown to be:

$$w(k) = (\Phi_D(k) + \Phi_U(k))^{-1}a_1(k) \quad (7)$$

The weight vector computed in equation 7 will provide the maximum attainable value of the instantaneous SINR and is expressed in terms of the thermal noise statistics on the antenna array and the channel gains between the transmitters and the antenna array. In a realizable system, the components of equation 7 are generally not known in advance and must be estimated by the receiver in order to implement equation 7. In the following discussion, the operation of invention is described as it typically operates in a realizable system.

In FIG. 3, numeral 300, the time-frequency slot has been designed such that pilot sequences are deployed on only a select few subcarriers. In the following description, subcarriers which contain a sequence of pilot symbols are called primary subcarriers, and subcarriers which do not contain a sequence of pilot symbols are called secondary subcarriers.

The purpose of the antenna combining method and device is to combine the signals from the antenna elements in the antenna array so as to suppress interference and provide a diversity gain when receiving the desired signal. The pilot sequences deployed within a time-frequency slot are used by the invention to compute the combining weights required to achieve these purposes.

In a preferred embodiment, the device of the present invention operates by storing the baseband symbols received from the antenna array. These received antenna symbols are stored by the receiving unit according to the antenna, the subcarrier, and the time point at which the symbols were received by the antenna array. The received antenna symbols are also classified according to whether they are pilot symbols (310) or information bearing data symbols (301).

After storing the received symbols, the combiner controller (108) computes a primary covariance matrix associated with each primary subcarrier. In a preferred embodiment, the primary covariance matrix associated with a primary subcarrier is computed according to the following equation:

$$\Phi_X = \frac{1}{P}\sum_{k=1}^{P} X(k)X^H(k) \quad (8)$$

where P is the number of pilot symbols on the primary subcarrier in question, X(k) is the vector of received antenna symbols for the k'th pilot symbol on the primary subcarrier in question, and superscript H denotes complex conjugate transpose. The summation in (8) is over the pilot symbols contained on the primary subcarrier in question. Other techniques for computing the primary covariance matrix for a primary subcarrier are possible. For example, if the channel responses of the desired and interfering signals are known or have been estimated, then the primary covariance matrix may be computed from the known or estimated channel responses.

Next, the combiner controller (108) computes a primary steering vector associated with each primary subcarrier. In a preferred embodiment, the primary steering vector $s_1$ is computed according to the following equation:

$$S_1 = \frac{1}{P}\sum_{k=1}^{P} X(k)r^*(k) \quad (9)$$

where P is the number of pilot symbols on the primary subcarrier in question, X(k) is the vector of received antenna symbols for the k'th pilot symbol on the primary subcarrier in question, and r(k) is the value of the pilot symbol, which is known in advance by the receiver, at the k'th pilot symbol on the primary subcarrier, and superscript * denotes complex conjugate. The summation in (9) is over the pilot symbols contained on the primary subcarrier in question.

Next, for the primary subcarriers, the combining weight vector is computed according to the following equation:

$$w = \Phi_X^{-1} S_1 \quad (10)$$

The output of the antenna combiner at the k'th symbol within the primary subcarrier in question is then computed to be:

$$y(k) = w^H(k)x(k) \quad (11)$$

This output symbol may then be fed into an information decoding unit (106) to estimate the information symbol transmitted by the transmitter.

Next, after the primary steering vectors and primary covariance matrices are computed for the primary subcarriers, a secondary steering vector and a secondary covariance matrix are computed for each of the secondary subcarriers. The secondary steering vectors and the secondary covariance matrices are computed to be functions of the values of the primary steering vectors and the primary covariance matrices. For example, the secondary steering vectors and covariance matrices may be computed by applying an interpolation procedure, such as a curve-fitting approach or any other similar techniques known in the art, to their primary values.

In a preferred embodiment, the secondary covariance matrices and the secondary steering vectors are computed as follows: For each particular entry in the secondary covariance matrix to be computed, the corresponding entries in the primary covariance matrices are conceptually treated as known points on a curve in the X-Y plane. The entries for the secondary covariance matrix are computed to "best-fit" the curve formed from the entries in the primary covariance matrices. For the secondary steering vectors, an identical procedure is used. One possible approach is to use a spline curve-fitting function for this purpose, although other interpolation methods known in the art are also appropriate.

Figure 4:
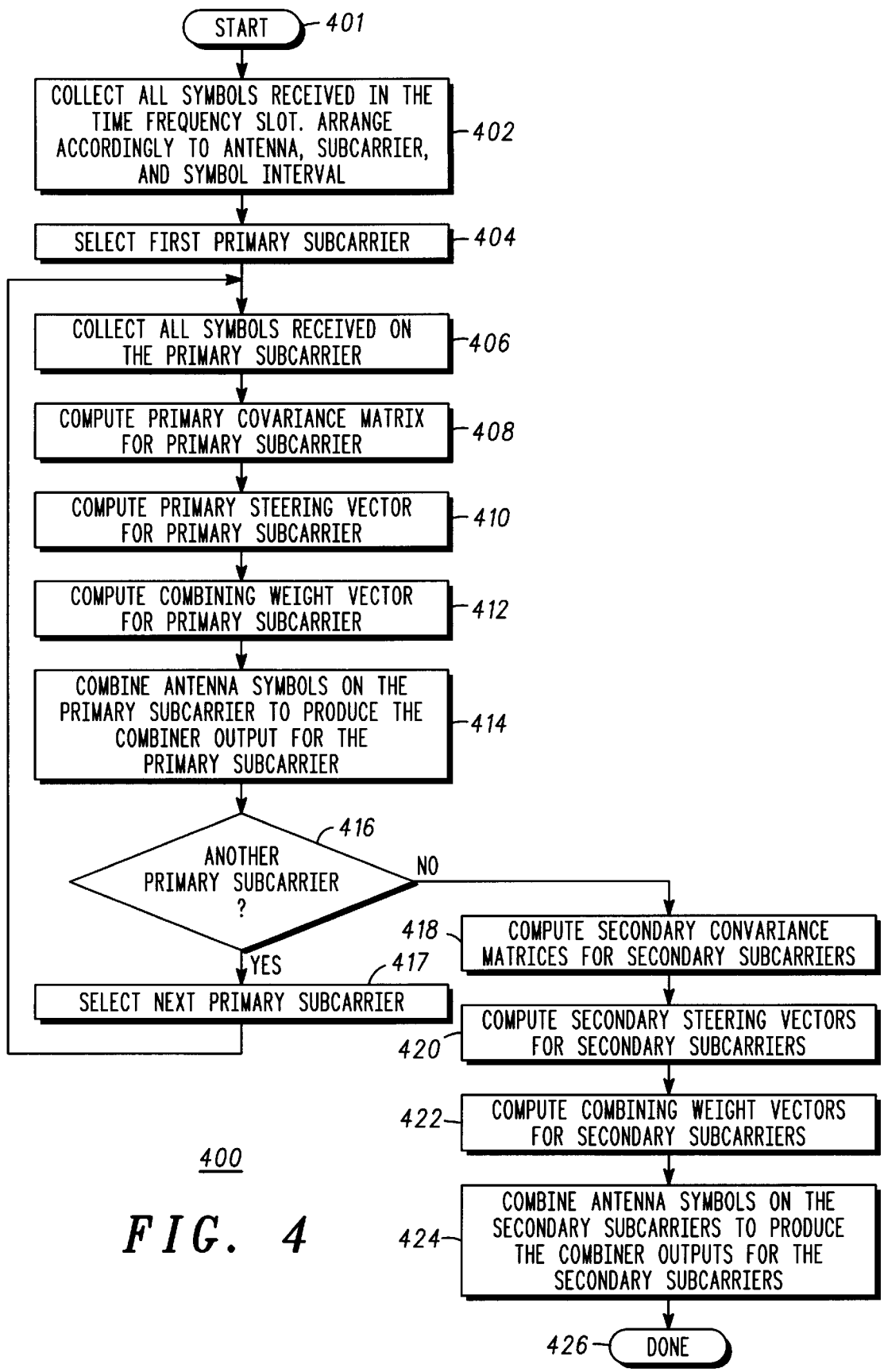
FIG. 4 is a flowchart diagram illustrating one embodiment of the steps performed by the Antenna Combiner Controller of FIG. 1 in accordance with the present invention.

FIG. 4, numeral 400, is a flowchart of the steps that are implemented by the antenna combiner (102) in a time-frequency slot. Commencing at the start (block 401), flow proceeds to (block 402) where the symbols produced by the receiving units (201) are stored and organized according to the antenna, subcarrier and symbol instant at which each symbol was received. Next, the first primary subcarrier is selected for processing (404), and flow proceeds to (block 406) where the symbols received on the selected primary subcarrier are collected. Next, the primary covariance matrix for the selected primary subcarrier is computed (408). In a preferred embodiment, equation (8) above is used to compute the primary covariance matrix. Next, (in block 410), the primary steering vector for the selected primary subcarrier is computed. In a preferred embodiment equation (9) above is used to compute the primary steering vector. Flow proceeds (from block 410 to block 412) to computing the weight vector for the primary subcarrier from equation 10 using the primary covariance matrix and steering vector associated with the selected primary subcarrier. After the combining weight vector for the selected primary subcarrier is computed (in block 412), the symbols received on the antennas (101) are combined to form the output of the combiner for the selected primary subcarrier.

After completing the production of the combiner output for the primary subcarrier (block 414), a check is made (in block 416) to see if another primary subcarrier needs to be processed. If the check is true, then the next primary subcarrier is selected (417) and flow proceeds back to collecting all symbols received on the primary subcarrier (block 406). If the check is false, then flow proceeds to computing secondary covariance matrices for secondary subcarriers (block 418). The secondary covariance matrices associated with the secondary subcarriers are computed (418) from the values of the primary covariance matrices which have been computed (in block 408). Flow proceeds (to block 420) to computing the secondary steering vectors associated with the secondary subcarriers from the values of the primary steering vectors computed that were previously computed (in block 410). The combining weight vector for each secondary subcarrier is computed (422) from equation (10) using the secondary covariance matrix and steering vectors associated with the particular secondary subcarrier. Next, the symbols received on the antennas 101 on the secondary subcarriers are combined (424) to form the combiner output for the secondary subcarriers. Flow then terminates for the time-frequency slot (at block 426).

Figure 5:
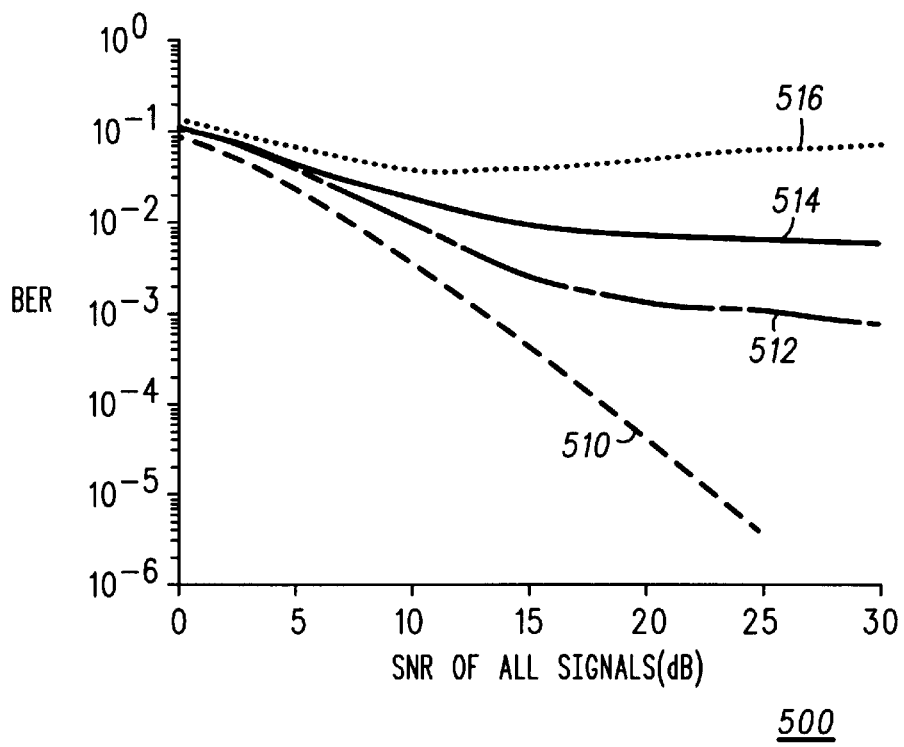
FIG. 5 is a graphical representation showing the simulated Bit Error Rate (BER) performance of the present invention when operating with one of the transmission formats depicted in FIG. 3.

In FIG. 5, numeral 500, the utility of the invention is demonstrated through the results of computer simulation. The simulation results show that the invention provides excellent bit-error-rate (BER) performance and interference suppression in the presence of frequency-selective and time-varying communication channels. The BER results presented in FIG. 5 is called the uncoded BER, which means no channel coding is in use.

To evaluate the performance of a preferred embodiment of the present invention, a four-element linear antenna array receiving three user signals of equal average power was simulated. FIG. 5 shows a plot of the uncoded BER of the desired signal that is achieved with a QPSK demodulator operating on the output of the antenna combiner (102). In FIG. 5, the uncoded BER versus the average received signal-to-noise ratio (SNR) of all incident signals is plotted for several combining methods, described below.

In the simulation, the signals received on the antenna are independently faded by the channel, which means the apparent directionality of an incident signal is not localized to any particular region in space around the array. In the simulation, the Doppler power spectrum for each user signal is assumed to be flat with a 15 Hz maximum Doppler frequency, which corresponds to a speed of 5 mph at a 2 GHz RF carrier frequency. The power delay profile for each user signal is assumed to be flat with a total width of 12 $\mu$sec. The array operates with the 3 subcarrier by 30 symbol OFDM slot structure, shown in the FIG. 4, having an OFDM symbol rate of 10 K symbols per second and a subcarrier spacing of 12.5 KHz. This slot structure has 16 pilot symbols on the first and third subcarriers, for a total of 32 pilot symbols in the slot. Both 16-symbol pilot sequences on subcarriers 1 and 3 are located at the 8'th through the 23'rd time symbol. The pilot sequences of the users are uncorrelated QPSK sequences that are varied from slot to slot. The pilot sequence of the desired user is assumed known by the receive array. At each SNR value on these curves, 5000 independently faded time-frequency slots were simulated. Since all incident signals in these examples have the same SNR per element, the incident desired signal to interference ratio per element is equal to a constant −3 dB throughout all curves presented in FIG. 5.

In FIG. 5, the theoretical BER curve (510) is shown for results when the array has perfect knowledge of the channel and solves equation (6) above for the optimal tracking weights that maximize the SINR at the output of the antenna combiner (102) on a symbol by symbol basis.

Next, the BER curve (512) is shown that is achieved when a preferred embodiment of the invention utilizes a spline curve fitting function to compute the secondary covariance matrices (in blocks 418 and 420 of FIG. 4).

In FIG. 5, the uncoded BER curve (514) is shown that results when the Sample Matrix Inversion (SMI) algorithm, an algorithm known in the art, is used by an antenna combiner for combining the signals received by the antennas (101). The SMI algorithm, whose performance is shown (curve 514), operates on all the pilot symbols received in the time-frequency slot, and computes a single combining weight vector for combining the symbols received throughout the time-frequency slot.

In FIG. 5, the uncoded BER curve (516) is shown that results when a straight-forward modification of the SMI algorithm, hereafter referred to as the Modified SMI algorithm, is used by an Antenna Combiner (102) and Combiner Controller (108) for combining the signals received by the antennas (101). The Modified SMI algorithm, whose performance is shown (curve 516), computes a different combining weight vector for each subcarrier within the slot. On primary subcarriers, the Modified SMI algorithm computes the sample steering vector and the sample covariance matrix using Equations (8) and (9) respectively, where the summations in Equations (8) and (9) are computed over the pilot symbols received on the primary subcarrier in question. On secondary subcarriers, the Modified SMI algorithm utilizes a spline curve-fitting function to compute the secondary steering vectors from the primary steering vectors. Also on secondary subcarriers, the Modified SMI algorithm computes the secondary covariance matrix using equation (9) above where the summation is over all the data symbols received on the secondary subcarrier in question. For each subcarrier in the time-frequency slot, the Modified SMI algorithm then computes the combining weight vector by substituting the covariance matrix and steering vector associated with the subcarrier in question into equation (10).

In FIG. 5, it is important to note that the BER performance of the present invention(shown by curve 512) is superior to the BER performance of other methods shown on the plot. It is also important to note that a baseline curve (510) is drawn for comparison purposes only, because the combining algorithm whose performance is shown by the baseline curve (curve 510) is typically not realizable unless the channel is known beforehand.

Figure 6:
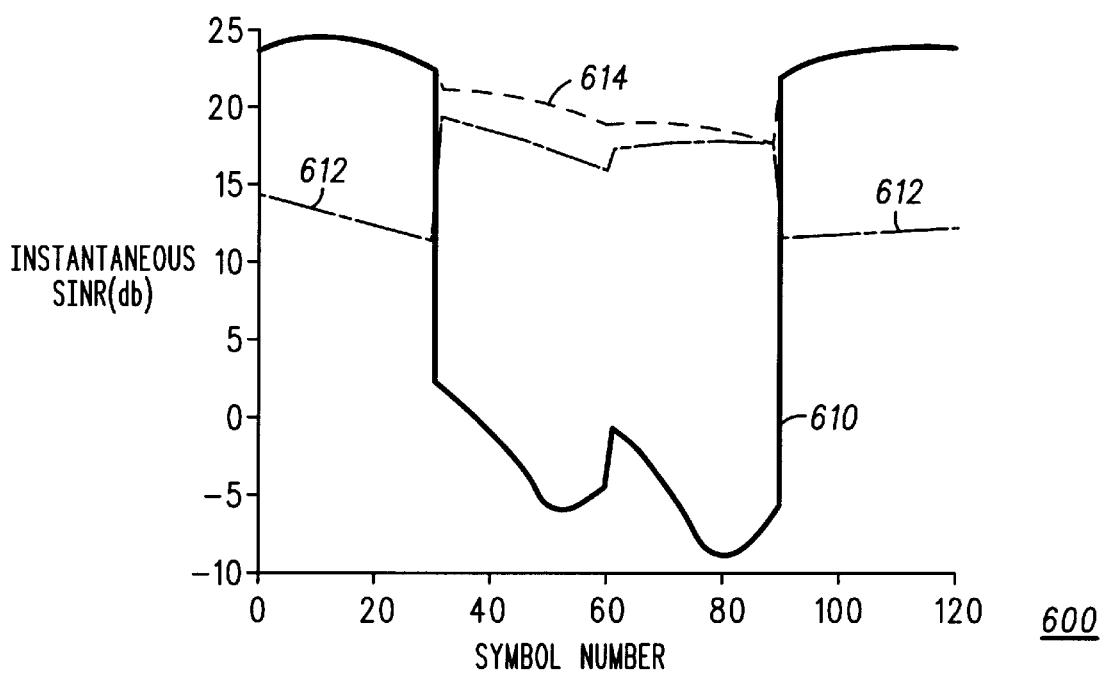
FIG. 6 is a graphical representation that shows a plot of the instantaneous Signal-to-lnterference-plus-Noise Ratio (SINR) of the present invention when using one of the time-frequency slots depicted in FIG. 3.

Next, FIG. 6, numeral 600, shows a plot of the instantaneous SINR achieved by a preferred embodiment of the present invention, the SMI algorithm, and the Modified SMI algorithm. FIG. 6 illustrates the instantaneous SINR as a function of the symbol instant within a sample realization of the four subcarrier by 30 symbol time-frequency slot shown in FIG. 3. Note that symbols 1 through 30 and symbols 91 through 120 are on primary subcarriers. Also, symbols 31 through 90 are on secondary subcarriers. A curve (610) representing the instantaneous SINR of the modified SMI algorithm is shown. Also, a curve (612) representing the instantaneous SINR of the SMI algorithm is shown. A curve (614) representing the instantaneous SINR of a preferred embodiment of the present invention is also shown. Note how the modified SMI algorithm (curve 610) performs much worse than the other methods on secondary subcarriers. Also, note how the SINR of the present invention (curve 614) is much higher than the SINR of the SMI algorithm (curve 612) on primary subcarriers. Note how on secondary subcarriers, the present invention (curve 614) generally achieves higher SINR than the SINR of the SMI algorithm (curve 612).

As demonstrated in the above discussion, the method and device of the present invention offer several benefits. First, the method permits a reduction in the number of pilot symbols that must be transmitted to train an adaptive antenna. Pilot sequences represent pure overhead that reduces the usable channel capacity, so any reduction in the number of the required number of pilot symbols would be advantageous. For example, when operating in OFDM, the invention permits some subcarriers to be allocated without any pilot symbols. Next, in a preferred embodiment, the technique and device suppress interference without any explicit knowledge of that interference.

Figure 7:
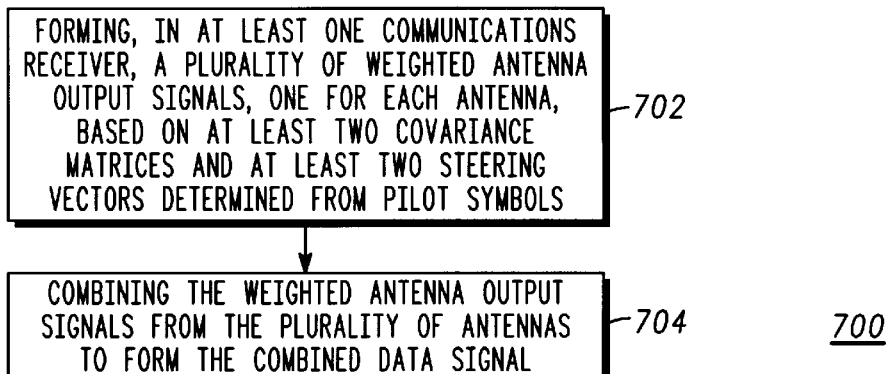
FIG. 7 is a flow chart showing one embodiment of steps in accordance with the method of the present invention.

Thus, as shown in FIG. 7, numeral 700, the method of the present invention provides for combining a plurality of antenna output signals to provide a combined data signal in a communication system where the antennas receive at least one user signal and where the at least one user signal contains pilot symbols and data symbols. The steps include: A) forming (702), in at least one communications receiver, a plurality of weighted antenna output signals, one for each antenna of a plurality of antennas, based on at least two covariance matrices and at least two steering vectors determined from pilot symbols; and B) combining (704) the weighted antenna output signals from the plurality of antennas to form the combined data signal.

The steps of the method may be embodied in a Digital Signal Processor, DSP, that has been programmed with said steps, an Application Specific Integrated Circuit, ASIC, arranged to provide said steps, in a gate array that has been arranged to provide said steps, or may be stored in a memory.

Figure 8:
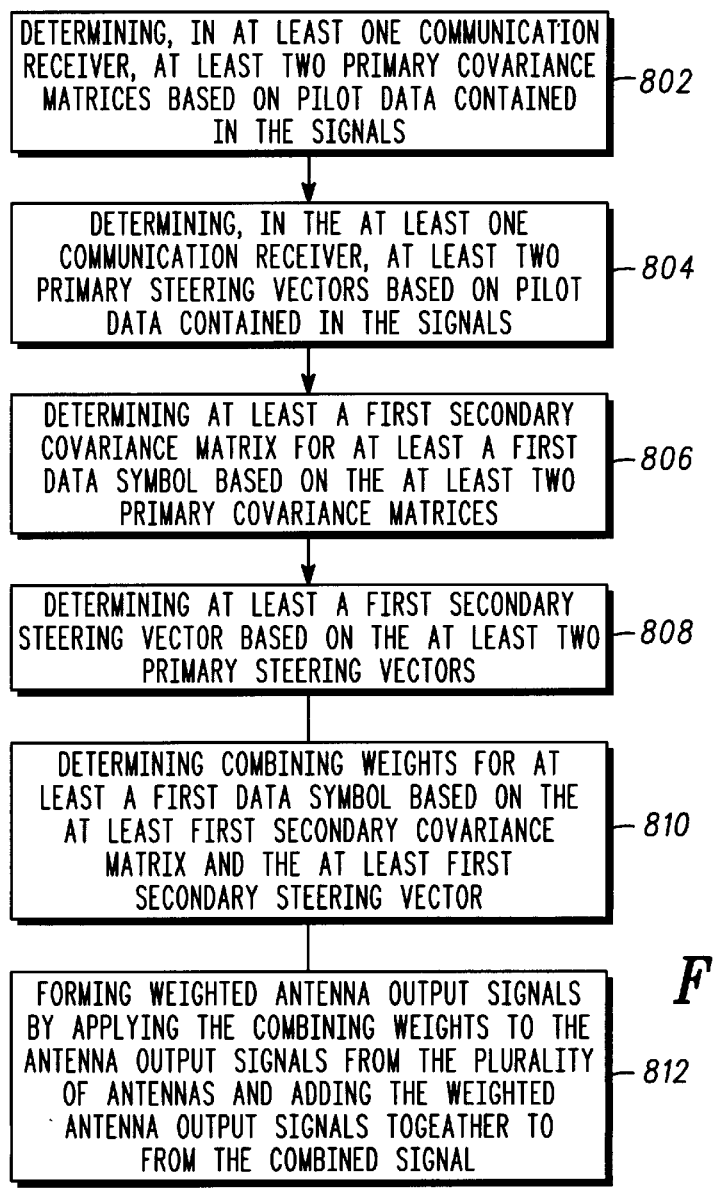
FIG. 8 is a flow chart showing another embodiment of steps in accordance with the method of the present invention.

Alternatively, as shown in FIG. 8, numeral 800, the method of the present invention may include the steps of: A) determining (802), in at least one communication receiver, at least two primary covariance matrices based on pilot data contained in the signals; B) determining (804), in the at least one communication receiver, at least two primary steering vectors based on pilot data contained in the signals; C) determining (806) at least a first secondary covariance matrix for at least a first data symbol based on the at least two primary covariance matrices; D) determining (808) at least a first secondary steering vector based on the at least two primary steering vectors; E) determining (810) combining weights for at least a first data symbol based on the at least first secondary covariance matrix and the at least first secondary steering vector; and F) forming weighted antenna output signals (812) by applying the combining weights to the antenna output signals from the plurality of antennas and adding the weighted antenna output signals together to form the combined signal.

Figure 9:
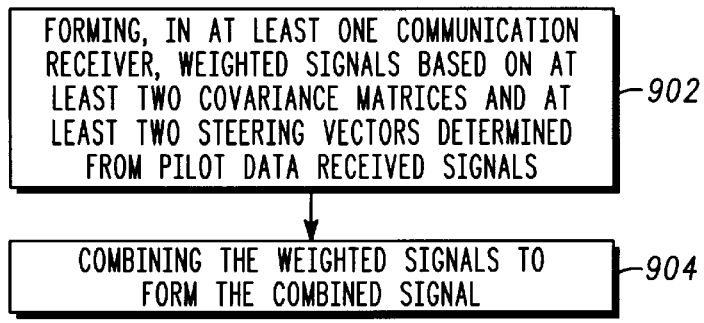
FIG. 9 is a flow chart showing another embodiment of steps in accordance with the method of the present invention.

Also, as shown in FIG. 9, numeral 900, the method of the present invention may be described as including the steps of: A) forming (902), in at least one communication receiver, weighted signals based on at least two covariance matrices and at least two steering vectors determined from pilot data of received signals; and B) combining (904) the weighted signals to form the combined signal.

Figure 10:
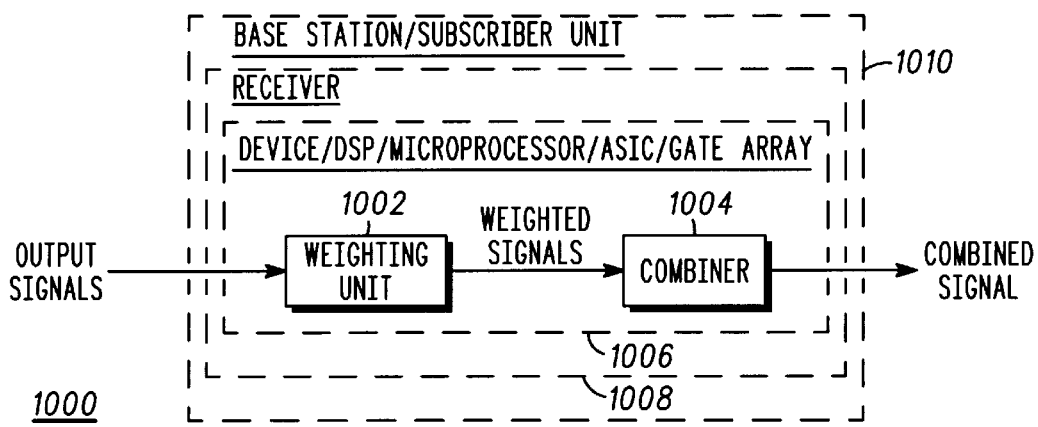
FIG. 10 is a block diagram of one embodiment of a device in accordance with the present invention.

As shown in FIG. 10, numeral 10, the device 1006 of the present invention combines output signals from a plurality of antennas in a communication system and typically includes: A) a weighting unit (1002), arranged to receive the output signals, for forming weighted signals based on at least two covariance matrices and at least two steering vectors determined from pilot data of received signals; and B) a combiner (1004), coupled to the weighting unit, for combining the weighted signals to form the combined signal.

Alternatively, the device (1006) of the present invention combines a data signal received by a plurality of antennas in a communication system where the antennas receive pilot signals and data signals, wherein the device includes: A) a weighting unit, arranged to receive the data signal and pilot signals, for forming, in at least one communications receiver, a weighted data signal for each antenna based on at least two covariance matrices and at least two steering vectors determined from pilot signals; and B) a combiner, coupled to the weighting unit, for combining the weighted data signals from the plurality of antennas to form the combined data signal. In this embodiment, the data signal and pilot signals are present in the output signals of the antennas.

The device (1006) is typically implemented in a Digital Signal Processor, DSP, a microprocessor, an Application Specific Integrated Circuit, ASIC, a gate array or a combination thereof.

A base station or a subscriber unit (1010) may have a receiver (1008) that includes the device (1006) of the present invention for combining a data signal received by a plurality of antennas in a communication system where the antennas receive pilot signals and data signals.

Figure 11:
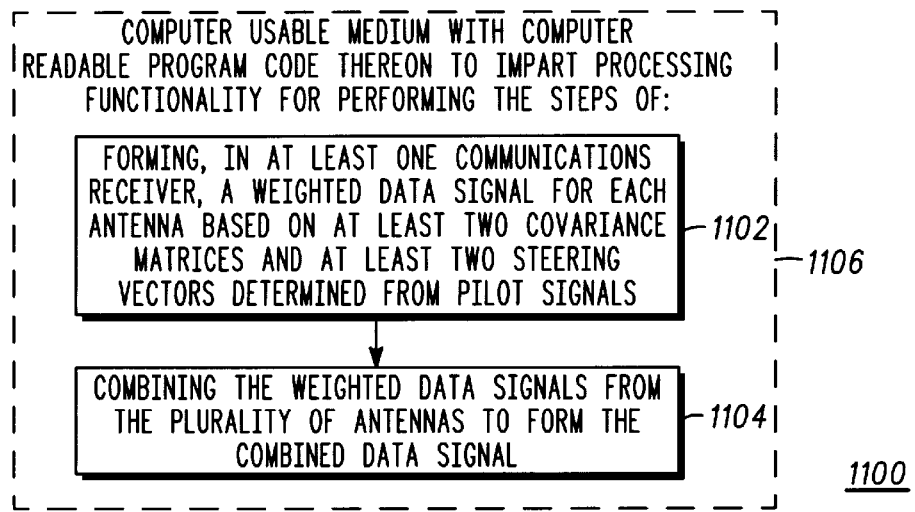
FIG. 11 is a block diagram of one embodiment of a computer usable medium with computer readable program code thereon to impart processing functionality for implementing the present invention.

Also, as shown in FIG. 11, numeral 1100, the present invention may be implemented in a computer usable medium (1106) which combines a data signal received by a plurality of antennas in a communication system where the antennas receive pilot signals and data signals. The computer usable medium (1106) typically has computer readable program code thereon to impart processing functionality for: A) forming (1102), in at least one communications receiver, a weighted data signal for each antenna based on at least two covariance matrices and at least two steering vectors determined from pilot signals; and B) combining (1104) the weighted data signals from the plurality of antennas to form the combined data signal.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

We claim:

1. A method for combining a plurality of antenna output signals to provide a combined data signal in a communication system where the antennas receive at least one user signal and where the at least one user signal contains pilot symbols and data symbols, comprising the steps of:
   A) forming, in at least one communications receiver, a plurality of weighted antenna output signals, one for each antenna of a plurality of antennas, based on at least two covariance matrices and at least two steering vectors determined from the pilot symbols; and
   B) combining the weighted antenna output signals from the plurality of antennas to form the combined data signal.

2. The method of claim 1 wherein the steps of the method are embodied in a Digital Signal Processor, DSP, that has been programmed with said steps.

3. The method of claim 1 wherein the steps of the method are embodied in an Application Specific Integrated Circuit, ASIC, arranged to provide said steps.

4. The method of claim 1 wherein the steps of the method are embodied in a gate array that has been arranged to provide said steps.

5. The method of claim 1 wherein the steps of the method are stored in a memory.

6. The method of claim 1 wherein the at least two covariance matrices are based on pilot symbols received during at least two different time intervals.

7. The method of claim 1 wherein the at least two covariance matrices are based on pilot symbols received on least two different frequencies.

8. A method for determining a combined signal from a plurality of antennas, comprising the steps of:
   A) determining, in at least one communication receiver, at least two primary covariance matrices based on pilot data contained in the signals;
   B) determining, in the at least one communication receiver, at least two primary steering vectors based on pilot data contained in the signals;
   C) determining at least a first secondary covariance matrix for at least a first data symbol based on the at least two primary covariance matrices;
   D) determining at least a first secondary steering vector based on the at least two primary steering vectors;
   E) determining combining weights for at least a first data symbol based on the at least first secondary covariance matrix and the at least first secondary steering vector; and
   F) forming weighted antenna output signals by applying the combining weights to the antenna output signals from the plurality of antennas and adding the weighted antenna output signals together to form the combined signal.

9. The method of claim 8 wherein the at least two primary covariance matrices are based on pilot data received during at least two different time intervals.

10. The method of claim 8 wherein the at least two primary covariance matrices are based on pilot data received on least two different frequencies.

11. The method of claim 8 wherein the at least first secondary covariance matrix is interpolated from the at least two primary covariance matrices.

12. A method for combining received signals from a plurality of antennas in a communication system, comprising the steps of:
   A) forming, in at least one communication receiver, weighted signals based on at least two covariance matrices and at least two steering vectors determined from pilot data of received signals; and
   B) combining the weighted signals to form a combined signal.

13. The method of claim 12 wherein the at least two covariance matrices are based on pilot symbols received during at least two different time intervals.

14. The method of claim 12 wherein the at least two covariance matrices are based on pilot symbols received on least two different frequencies.

15. A device for combining output signals from a plurality of antennas in a communication system, comprising:
   A) a weighting unit, arranged to receive the output signals, for forming weighted signals based on at least two covariance matrices and at least two steering vectors determined from pilot data of received signals; and
   B) a combiner, coupled to the weighting unit, for combining the weighted signals to form a combined signal.

16. A device for combining a data signal received by a plurality of antennas in a communication system where the antennas receive pilot signals and data signals, comprising:
   A) a weighting unit, arranged to receive the data signal and pilot signals, for forming, in at least one communications receiver, a weighted data signal for each antenna based on at least two covariance matrices and at least two steering vectors determined from pilot signals; and
   B) a combiner, coupled to the weighting unit, for combining the weighted data signals from the plurality of antennas to form a combined data signal.

17. The device of claim 16 wherein the device is in a Digital Signal Processor, DSP.

18. The device of claim 16 wherein the device is in a microprocessor.

19. The device of claim 16 wherein the apparatus is in an Application Specific Integrated Circuit, ASIC.

20. The device of claim 16 wherein the apparatus is in a gate array.

21. A base station having a receiver that includes a device for combining a data signal received by a plurality of antennas in a communication system where the antennas receive pilot signals and data signals, the device comprising:
- A) a weighting unit, arranged to receive the data signal and pilot signals, for forming, in at least one communications receiver, a weighted data signal for each antenna based on at least two covariance matrices and at least two steering vectors determined from pilot signals; and
- B) a combiner, coupled to the weighting unit, for combining the weighted data signals from the plurality of antennas to form a combined data signal.

22. A subscriber unit having a receiver that includes a device for combining a data signal received by a plurality of antennas in a communication system where the antennas receive pilot signals and data signals, the device comprising:
- A) a weighting unit, arranged to receive the data signal and pilot signals, for forming, in at least one communications receiver, a weighted data signal for each antenna based on at least two covariance matrices and at least two steering vectors determined from pilot signals; and
- B) a combiner, coupled to the weighting unit, for combining the weighted data signals from the plurality of antennas to form a combined data signal.

23. A computer usable medium for combining a data signal received by a plurality of antennas in a communication system where the antennas receive pilot signals and data signals, wherein the computer usable medium has computer readable program code thereon to impart processing functionality for:
- A) forming, in at least one communications receiver, a weighted data signal for each antenna based on at least two covariance matrices and at least two steering vectors determined from pilot signals; and
- B) combining the weighted data signals from the plurality of antennas to form a combined data signal.

* * * * *